United States Patent
Campbell

[19]

[11] Patent Number: 6,021,576
[45] Date of Patent: Feb. 8, 2000

[54] TRAILER TRAMMEL

[76] Inventor: Richard D. Campbell, 906 Delaware Dr., Matamoras, Pa. 18336

[21] Appl. No.: 09/018,995

[22] Filed: Feb. 5, 1998

[51] Int. Cl.$^7$ .................................................. G01B 5/255
[52] U.S. Cl. ..................................... 33/203.21; 33/203.17; 33/600
[58] Field of Search ........................... 33/203.21, 203.17, 33/203.15, 600, 608, 18.1; 248/298.1, 188.4

[56] References Cited

U.S. PATENT DOCUMENTS

| 2,543,197 | 2/1951 | Phillips, Sr. | 33/203.17 |
| 2,616,186 | 11/1952 | Shooter et al. | 33/203.17 |
| 4,167,816 | 9/1979 | Jarman et al. | 33/203.12 |
| 4,393,594 | 7/1983 | Hoffman et al. | 33/203.16 |
| 4,413,420 | 11/1983 | Hoffman et al. | 33/608 |
| 4,939,848 | 7/1990 | Armstrong | 33/608 |

FOREIGN PATENT DOCUMENTS

| 38935 | 10/1931 | France | 248/188.4 |

*Primary Examiner*—Diego Gutierrez
*Assistant Examiner*—R A Smith
*Attorney, Agent, or Firm*—Kaardal & Associates, P.C.

[57] ABSTRACT

A trailer trammel is provided including a pair of feet assemblies for being rested on a recipient surface. Also included is a trammel releasably connected between the feet assemblies whereby a toe-in of wheels of a vehicle may be determined. During use, the trammel is removable from the feet assemblies for checking a center-to-center axle alignment of the wheels.

1 Claim, 2 Drawing Sheets

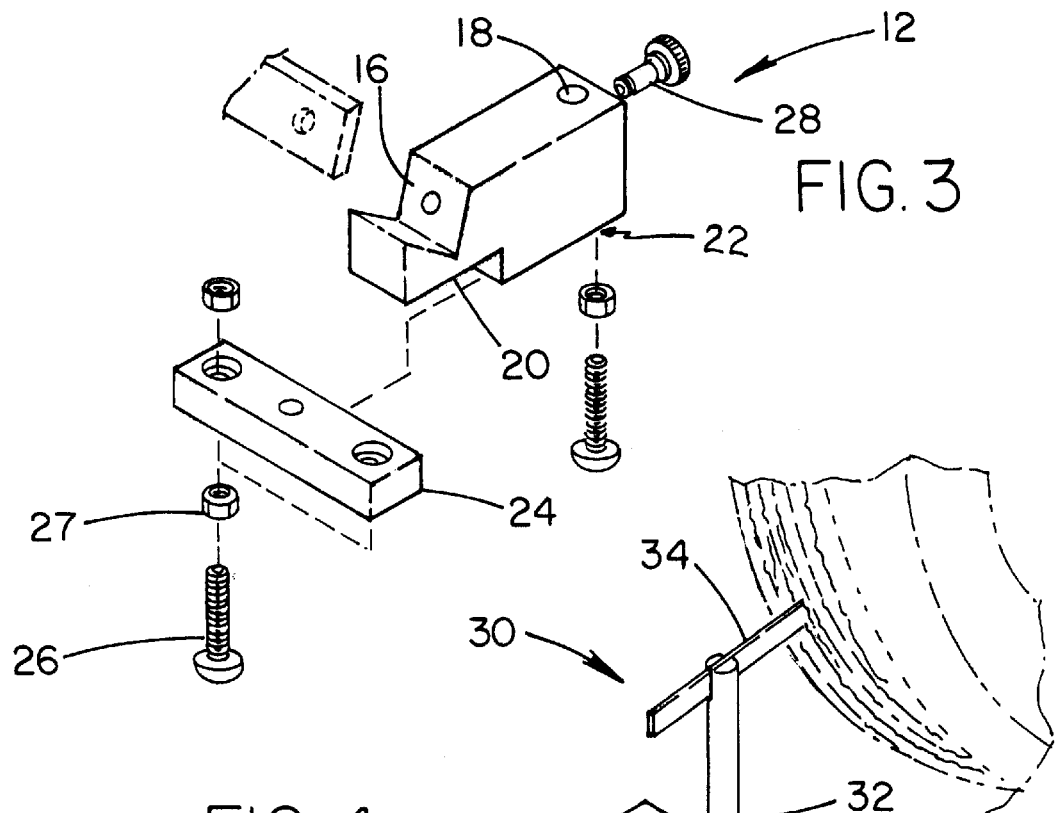
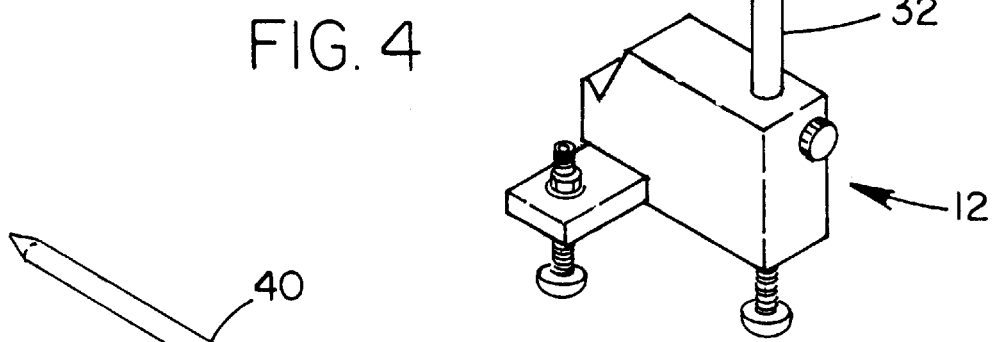
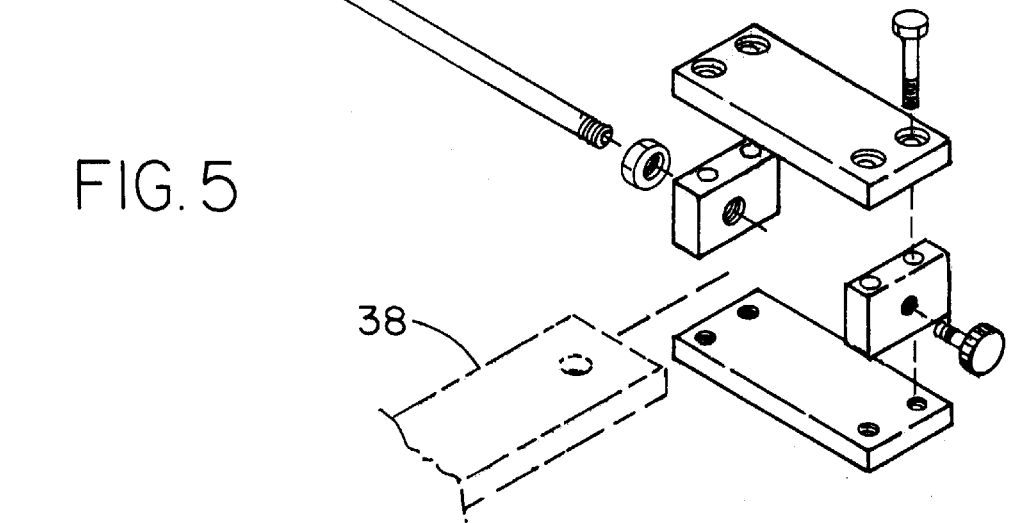

TRAILER TRAMMEL

BACKGROUND OF THE INVENTION

1. Field of the Invention

The present invention relates to trammels and more particularly pertains to a new trailer trammel for utilizing a trammel and feet assemblies for checking various critical parameters of wheels of a vehicle.

2. Description of the Prior Art

The use of trammels is known in the prior art. More specifically, trammels heretofore devised and utilized are known to consist basically of familiar, expected and obvious structural configurations, notwithstanding the myriad of designs encompassed by the crowded prior art which have been developed for the fulfillment of countless objectives and requirements.

Known prior art trammels include U.S. Pat. No. 4,569,140; U.S. Pat. No. 4,433,489; U.S. Pat. No. 4,338,027; U.S. Pat. No. 5,311,668; U.S. Pat. No. 4,383,370; and U.S. Pat. Des. 245,967.

In these respects, the trailer trammel according to the present invention substantially departs from the conventional concepts and designs of the prior art, and in so doing provides an apparatus primarily developed for the purpose of utilizing a trammel and feet assemblies for checking various critical parameters of wheels of a vehicle.

SUMMARY OF THE INVENTION

In view of the foregoing disadvantages inherent in the known types of trammels now present in the prior art, the present invention provides a new trailer trammel construction wherein the same can be utilized for utilizing a trammel and feet assemblies for checking various critical parameters of wheels of a vehicle.

The general purpose of the present invention, which will be described subsequently in greater detail, is to provide a new trailer trammel apparatus and method which has many of the advantages of the trammels mentioned heretofore and many novel features that result in a new trailer trammel which is not anticipated, rendered obvious, suggested, or even implied by any of the prior art trammels, either alone or in any combination thereof.

To attain this, the present invention generally comprises a pair of feet assemblies each with a central portion having a generally rectangular configuration. As shown in FIG. 3, the central portion of each foot is equipped with a top face, a bottom face, a pair of side faces and a pair of end faces. The top face has a triangular recess formed therein adjacent to a first end face. A vertically oriented bore is also formed in the central portion adjacent to a second end face. The bottom face of the central portion has a rectangular recess formed therein adjacent to the first end face. Also formed on the bottom face is a vertically oriented threaded bore formed therein adjacent to the second end face. Each foot assembly further includes a rectangular cross bar coupled at a central extent thereof within the rectangular recess of the central portion. As such, a pair of ends extend laterally from the central portion. Each of these ends is equipped with a vertically oriented threaded bore formed therein. A plurality of bolts each have a hemispherical bottom and a threaded upper post for coupling with a corresponding threaded bore of the central portion and cross bar. By this structure, the bolts are adapted for supporting the corresponding assembly at an elevated orientation. A set screw is adapted to be releasably inserted within the bore of the top face of the central portion. Also included is a scribe unit with a post having a lower end for being removably secured within the bore of the top face of the central portion of one of the feet assemblies. Such securement is accomplished via the set screw of the foot assembly. An upper end of the post has scriber material extending therefrom for scribing a line around a jacked up wheel to ensure that the line is straight in true perspective with an axis. See FIG. 4. Also included is a trammel assembly including a rectilinear connector beam. The beam serves for being removably mounted between the triangular recesses of the feet assemblies. A pair of pointer rods each include a sleeve for being selectively slid along the connector beam. A set screw is provided for selectively fixing the sleeve with respect to the connector beam. Note FIG. 5. The pointer rods each have an inboard end coupled to the corresponding sleeve and a pointed outboard end. The rod is maintained at a constant angle, whereby a toe-in of the wheels may be determined. It should be noted that the trammel assembly is removable from the feet assemblies for checking a center-to-center axle alignment of the wheels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer trammel apparatus and method which has many of the advantages of the trammels mentioned heretofore and many novel features that result in a new trailer trammel which is not anticipated, rendered obvious, suggested, or even implied by any of the prior art trammels, either alone or in any combination thereof.

It is another object of the present invention to provide a new trailer trammel which may be easily and efficiently manufactured and marketed.

It is a further object of the present invention to provide a new trailer trammel which is of a durable and reliable construction.

An even further object of the present invention is to provide a new trailer trammel which is susceptible of a low cost of manufacture with regard to both materials and labor, and which accordingly is then susceptible of low prices of sale to the consuming public, thereby making such trailer trammel economically available to the buying public.

Still yet another object of the present invention is to provide a new trailer trammel which provides in the apparatuses and methods of the prior art some of the advantages thereof, while simultaneously overcoming some of the disadvantages normally associated therewith.

Still another object of the present invention is to provide a new trailer trammel for utilizing a trammel and feet assemblies for checking various critical parameters of wheels of a vehicle.

Even still another object of the present invention is to provide a new trailer trammel that includes a pair of feet assemblies for being rested on a recipient surface. Also included is a trammel releasably connected between the feet assemblies whereby a toe-in of wheels of a vehicle may be determined. During use, the trammel is removable from the feet assemblies for checking a center-to-center axle alignment of the wheels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded view of one of the feet assemblies of the present invention.

FIG. 4 is a perspective view of the scribe unit of the present invention.

FIG. 5 is an exploded view of one of the pointer rods of the trammel assembly of the present invention.

DESCRIPTION OF THE PREFERRED EMBODIMENT

Figure 1:
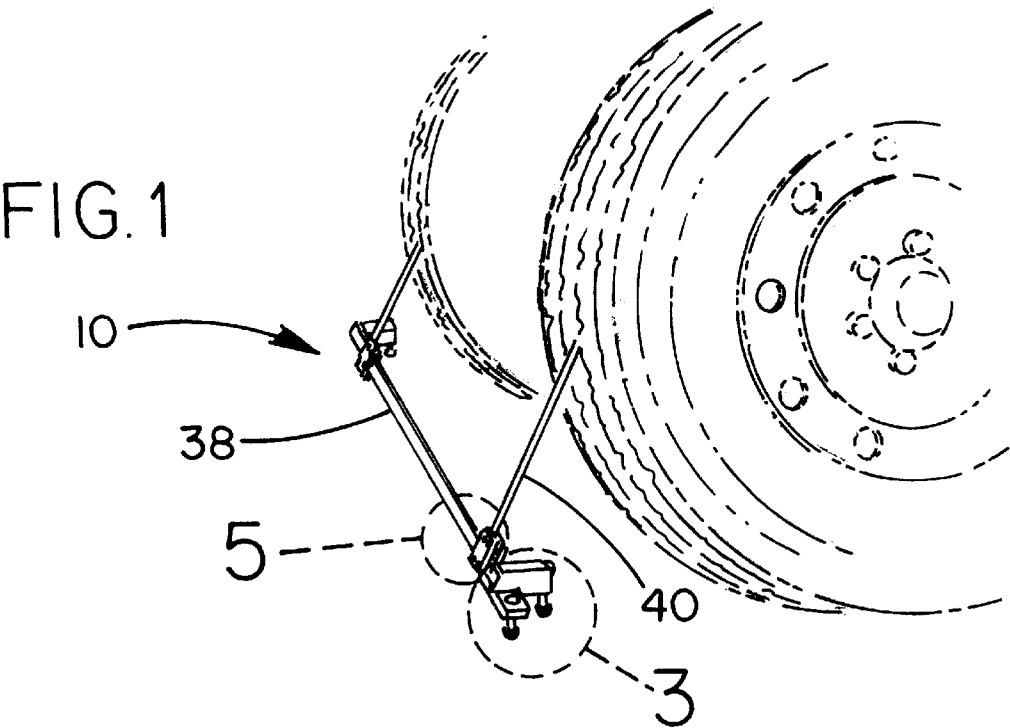
FIG. 1 is a perspective view of a new trailer trammel wherein the trammel assembly is used with the feet assemblies.
Figure 2:
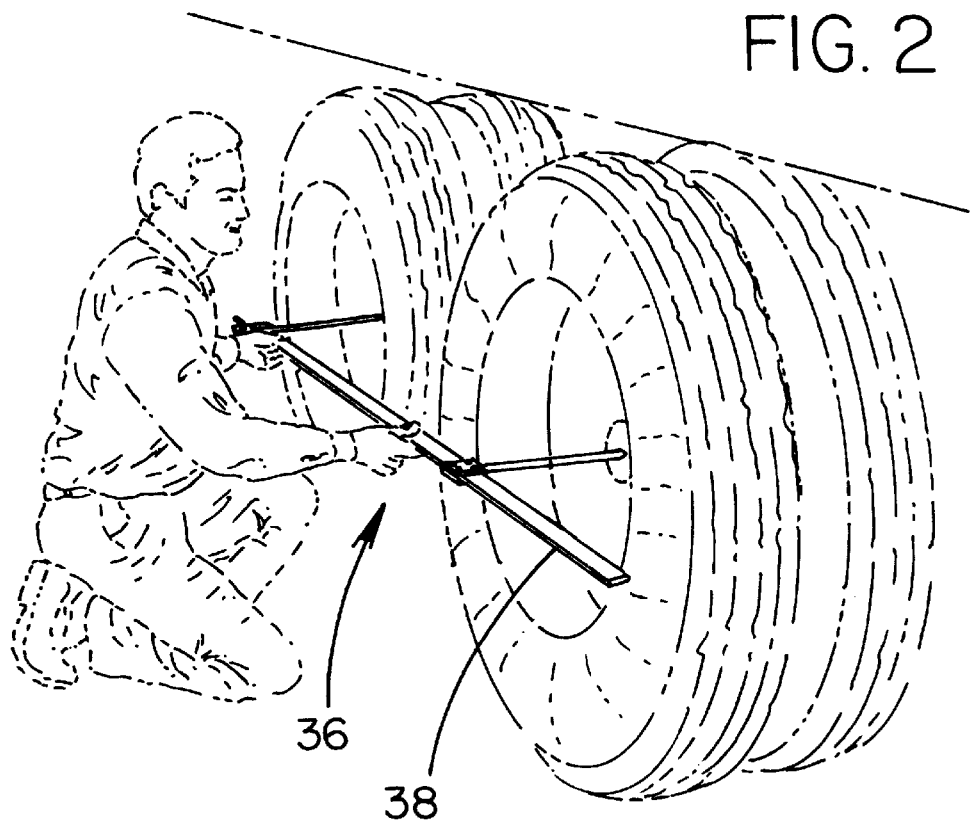
FIG. 2 is a perspective view of the present invention with the trammel assembly used by itself.

With reference now to the drawings, and in particular to FIGS. 1 through 5 thereof, a new trailer trammel embodying the principles and concepts of the present invention and generally designated by the reference numeral 10 will be described.

The present invention, designated as numeral 10, includes a pair of feet assemblies 12 each with a central portion 14 having a generally rectangular configuration. As shown in FIG. 3, the central portion of each foot is equipped with a top face, a bottom face, a pair of side faces and a pair of end faces.

The top face has a triangular recess 16 formed therein adjacent to a first end face. A vertically oriented bore 18 is also formed in the top face of the central portion adjacent to a second end face. The bottom face of the central portion has a rectangular recess 20 formed therein adjacent to the first end face. Also formed on the bottom face is a vertically oriented threaded bore 22 adjacent to the second end face.

Each foot assembly further includes a rectangular cross bar 24 coupled at a central extent thereof within the rectangular recess of the central portion. Such coupling is preferably afforded by a screw or the like. As such, a pair of ends of the cross bar extend laterally from the central portion. Each of these ends is equipped with a vertically oriented threaded bore. A plurality of bolts 26 each have a hemispherical bottom and a threaded upper post for coupling with a corresponding threaded bore of the central portion and cross bar. A plurality of nuts 27 are included to facilitate such coupling, as shown in FIG. 3. By this structure, the bolts are adapted for supporting the corresponding assembly at an elevated orientation. A set screw 28 is adapted to be releasably inserted within the bore of the top face of the central portion for reasons that will soon become apparent.

Also included is a scribe unit 30 with a post 32 having a lower end for being removably secured within the bore of the top face of one of the feet assemblies. Such securement is accomplished via the set screw of the foot assembly. An upper end of the post has scriber material 34 extending therefrom for scribing a line around a jacked up wheel to ensure that the line is straight in true perspective with an axis. See FIG. 4. Such material preferably includes a oil hardening flat stock AISI heat treat 48–52 Rockwell C.

Also included is a trammel assembly 36 including a rectilinear connector beam 38. The beam serves for being removably mounted between the triangular recesses of the feet assemblies. A pair of pointer rods 40 are each releasably connected to a sleeve for being selectively slid along the connector beam. Preferably, each pointer rod has a length equal to ½ that of the connector beam. A set screw is provided for selectively fixing the sleeve with respect to the connector beam. Note FIG. 5. As shown in such Figure, each sleeve is formed of four planar rectangular plates interconnected by way of screws.

The pointer rods have an inboard end coupled to the corresponding sleeve and a pointed outboard end. The rod is maintained at a constant angle, whereby a toe-in of the wheels may be determined. With the feet assemblies installed, the trammel assembly would be placed under the front of the truck in front of the wheel. The rods meet the wheel at a height of approximately 14 inches. They are adjusted to the lines made by the scriber unit and secured in place. The trammel is then moved to the rear of the wheels and the distance between the lines are compared. Tie-rod adjustment would then be effected as necessary.

It should be noted that the trammel assembly is removable from the feet assemblies for checking a center-to-center axle alignment of the wheels. If a difference exists between the axles of two pairs of wheels of the vehicle, a torque arm may be adjusted to correct the same.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer trammel comprising, in combination:

a pair of feet assemblies each including a central portion having a generally rectangular configuration with a top face, a bottom face, a pair of side faces and a pair of end faces, the top face having a triangular recess formed therein adjacent to a first end face and a vertically oriented bore formed therein adjacent to a second end face, the bottom face having a rectangular recess formed therein adjacent to the first end face and a vertically oriented threaded bore formed therein adjacent to the second end face, each foot assembly further including a rectangular cross bar coupled at a central extent thereof within the rectangular recess of the central portion such that a pair of ends extend therefrom each with a vertically oriented threaded bore formed therein, a plurality of bolts each with a hemispherical bottom and a threaded upper post for coupling with a corresponding threaded bore of the central portion and cross bar for supporting the corresponding assembly at an elevated orientation, and a set screw adapted to be releasably inserted within the bore of the top face of the central portion;

a scribe unit including a post having a lower end for being removably secured within the bore of the top face of the central portion of one of the feet assemblies via the set screw thereof and an upper end with a scriber material extending therefrom for scribing a line around a jacked up wheel to ensure that the line is straight in true perspective with an axis; and a trammel assembly including a rectilinear connector beam for being removably mounted between the triangular recesses of the feet assemblies and a pair of pointers each including a sleeve for being selectively slid along the connector beam, a set screw for selectively fixing the sleeve with respect to the connector beam and a pointer rod having an inboard end coupled to the corresponding sleeve and a pointed outboard end, wherein the pointer rod is maintained at a constant angle, whereby a toe-in of the wheels may be determined;

said trammel assembly being removable from the feet assemblies for checking a center-to-center axle alignment of the wheels.

* * * * *